United States Patent [19]

Ide et al.

[11] 4,407,139
[45] Oct. 4, 1983

[54] METHOD FOR CONTROLLING AN AIR CONDITIONING SYSTEM

[75] Inventors: Yuuichi Ide; Harunobu Nukushina, both of Fuji, Japan

[73] Assignee: Tokyo Shibaura Denki Kabushiki Kaisha, Kanagawa, Japan

[21] Appl. No.: 309,413

[22] Filed: Oct. 7, 1981

[30] Foreign Application Priority Data

Oct. 13, 1980 [JP] Japan ............................. 55-142769

[51] Int. Cl.³ ............................................. F25B 1/00
[52] U.S. Cl. ....................................... 62/215; 62/158; 62/229; 62/228.4
[58] Field of Search ............... 62/229, 228 B, 228 C, 62/226, 225, 215, 157, 158, 231; 165/12, 26, 41, 42, 43, 44; 236/1 EA, 46 F, 1 EB, 46 R, 78

[56] References Cited

U.S. PATENT DOCUMENTS

| | | | |
|---|---|---|---|
| 3,933,197 | 1/1976 | Zimmer et al. | 165/2 |
| 4,265,299 | 5/1981 | Harnish | 165/12 |
| 4,269,261 | 5/1981 | Kountz et al. | 165/12 |

Primary Examiner—Albert J. Makay
Assistant Examiner—Harry Tanner
Attorney, Agent, or Firm—Stevens, Davis, Miller & Mosher

[57] ABSTRACT

In a method for controlling an air conditioning system including a frequency-variable power source device for providing an AC electric power of a variable frequency, and a compressor driven by the AC electric power, the air conditioning power of the conditioning system being dependent on the frequency of the AC electric power, the temperature of the air to be conditioned is detected; and a frequency set value is determined in accordance with a deviation of the detected temperature with reference to a set temperature. For determining the frequency set value, a plurality of temperature deviation zones are defined; the frequency set value is changed when the deviation transits from one of the zones to another; and the frequency set value is also changed when the deviation continues to be within one of the zones of a relatively great deviation over a predetermined length of time.

6 Claims, 10 Drawing Figures

METHOD FOR CONTROLLING AN AIR CONDITIONING SYSTEM

BACKGROUND OF THE INVENTION

The present invention relates to a method for controlling an air conditioning system of a type wherein the rotational speed of a compressor provided therein is changed in accordance with the load of the air conditioning system.

An air conditioning system is a system for maintaining various aspects of the air within a certain space. The load of the air conditioning system or the air conditioning load includes a heating load, i.e., amount of heat to be given to the air within a unit time, or a cooling load, i.e., amount of heat to be removed from the air within a unit time. The load of the air conditioning system also includes a humidity regulating load, i.e., amount of moisture to be given to or removed from the air within a unit time. However, because the temperature is a greater factor, the air conditioning load can be roughly estimated from the deviation of the actual temperature with reference to the temperature set value.

On the other hand, the cooling or heating power or effect of the air conditioning system can be varied over a wide range by varying the rotational speed of a compressor provided in the air conditioning system.

It will therefore be appreciated that varying the compressor speed in accordance with the air conditioning load will improve the efficiency of the air conditioning system and reduce energy consumption.

A conventional control system for varying the compressor speed in accordance with the air conditioning load includes linear circuits wherein an analog (continuous or nondiscrete) signal is used for indicating the difference between the detected temperature and the reference temperature and as a basis for determining the frequency of the AC current supplied to the compressor motor. As a result, the circuitry of the conventional system is complicated.

SUMMARY OF THE INVENTION

An object of the invention is to provide a method for controlling an air conditioning system which can be effected by the use of a control system which is simple in construction.

Another object of the invention is to provide a method for controlling an air conditioning system wherein the speed of the compressor is accurately controlled.

According to the invention, there is provided a method for controlling an air conditioning system including a frequency-variable power source device for providing an AC electric power of a variable frequency, and a compressor driven by the AC electric power, the air conditioning power of the conditioning system being dependent on the frequency of the AC electric power, the method comprising the steps of:
  detecting the temperature of the air to be conditioned,
  providing a set value for the air temperature,
  determining a deviation of the detected temperature with reference to the set temperature,
  determining a frequency set value in accordance with the deviation, and
  providing a frequency setting signal indicative of the frequency set value used to determine the frequency of the AC electric power,
the step of determining the frequency set value comprising:
  defining, in advance, a plurality of temperature deviation zones,
  changing the frequency set value when the deviation transits from one of the zones to another, and
  changing the frequency set value when the deviation continues to be within one of the zones of a relatively great deviation over a predetermined length of time.

DETAILED DESCRIPTION OF THE PREFERRED EMBODIMENT

Figure 1:
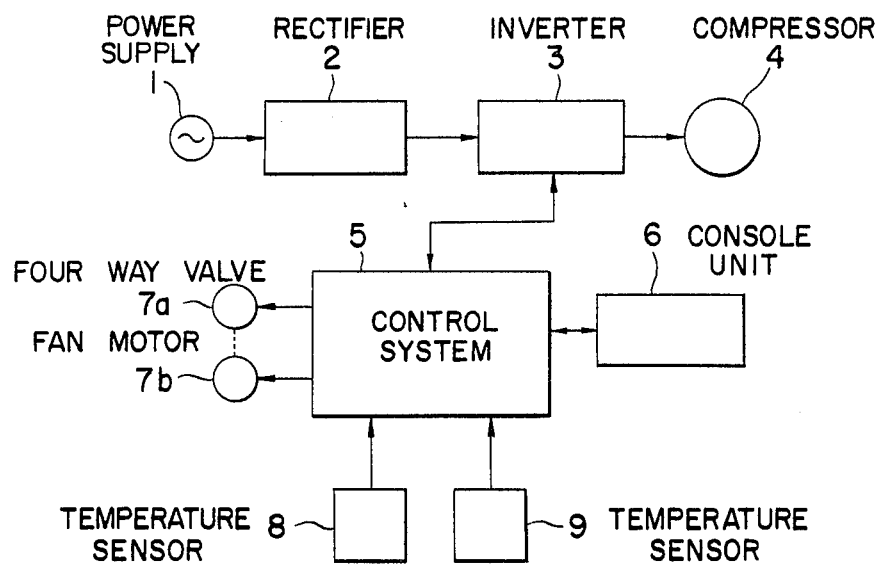
FIG. 1 is a block diagram showing an air conditioning system.

FIG. 1 shows a general construction of an air conditioning system.

An AC voltage from an AC electric power source 1 is converted into a DC voltage by a rectifier 2, and is applied to an inverter 3. The inverter 3 produces an AC voltage whose frequency is continuously or steplessly variable over a range of, for example, from 25–80 Hz. The frequency of the AC voltage at any particular instant is determined by a digital signal, called a frequency setting signal, applied to the inverter 3. Thus, the inverter 3 serves as a device for producing an AC voltage of a frequency which is variable in accordance with a frequency setting signal. The AC voltage from the inverter 3 is supplied to a compressor 4 including a drive motor which is for example a two pole induction motor. The synchronous speed of this motor then varies over a range of from 1500 to 4800 rpm. The cooling or heating capacity of the air conditioning system is dependent on the speed of the compressor 4.

The frequency setting signal is provided by a control system 5 which is mainly formed of a microcomputer. The control system 5 receives a reference temperature signal from a console unit 6 and detected temperature signals from temperature sensors 8 and 9, and processes these signals in accordance with a stored program, which will be described later, to provide the frequency setting signal. The control system 5 also provides signals for operating a four-way valve 7a for switchover between heating and cooling operations, and a fan motor 7b, as well as a signal indicating how the compressor 4 is operating. The latter signal is supplied to the console unit 6 and a display is made, on a display unit provided on the unit 6, in accordance with the signal.

Figure 2:
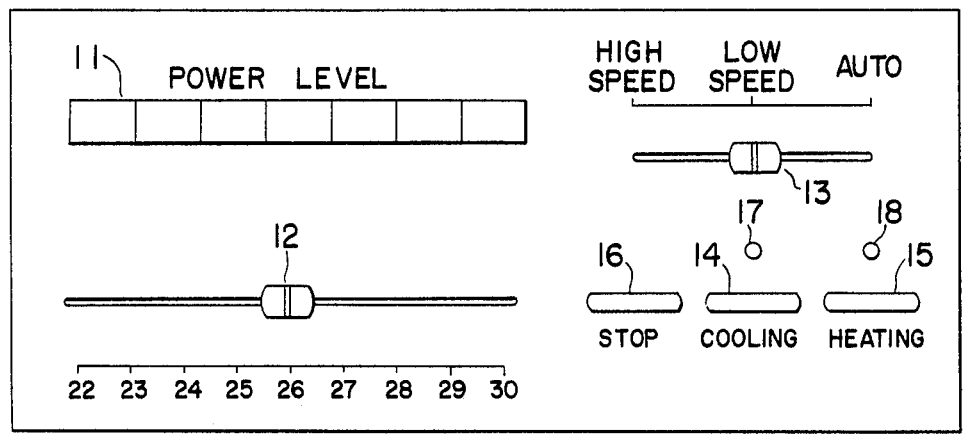
FIG. 2 is a front view showing a front panel of a console unit.

FIG. 2 shows a front view of an example of the console unit 6. As shown, provided on the front panel are a bar display unit 11 in the form of an LED (light emitting diode) displaying the rotational speed of the compressor 4 as a cooling or heating power and a temperature setting device 12 by which the set value of the temperature is manually inputted. A reference temperature signal is produced in accordance with this setting. A select switch 13 is used for selecting the rotational speed of the fan for blowing the cooled or heated air into the space e.g., the room. Pushbutton switches 14, 15 and 16 are respectively provided for starting a cooling operation, starting a heating operation, and stopping a operation. Display units 17 and 18 in the form of LED's are for displaying, respectively, that the system is in cooling operation and that the system is in heating operation. A reference temperature signal determined by the setting of the setting device 12, a speed select signal produced by the operation of the select switch 13, and start and stop signals produced by the operation of the pushbutton switches 14, 15 and 16 are supplied to the control system 5. On the other hand, the control system 5 provides signals used for display by the bar display unit 11 and display units 17 and 18.

A sensor 8 is used to detect the temperature of the air within the room. A sensor 9 is used to detect the condensation temperature or the evaporation temperature of the refrigerant.

The signal from the sensor 9 is used to control the frequency thereby to keep the pressure in the refrigeration system within a permissible range.

Figure 3:
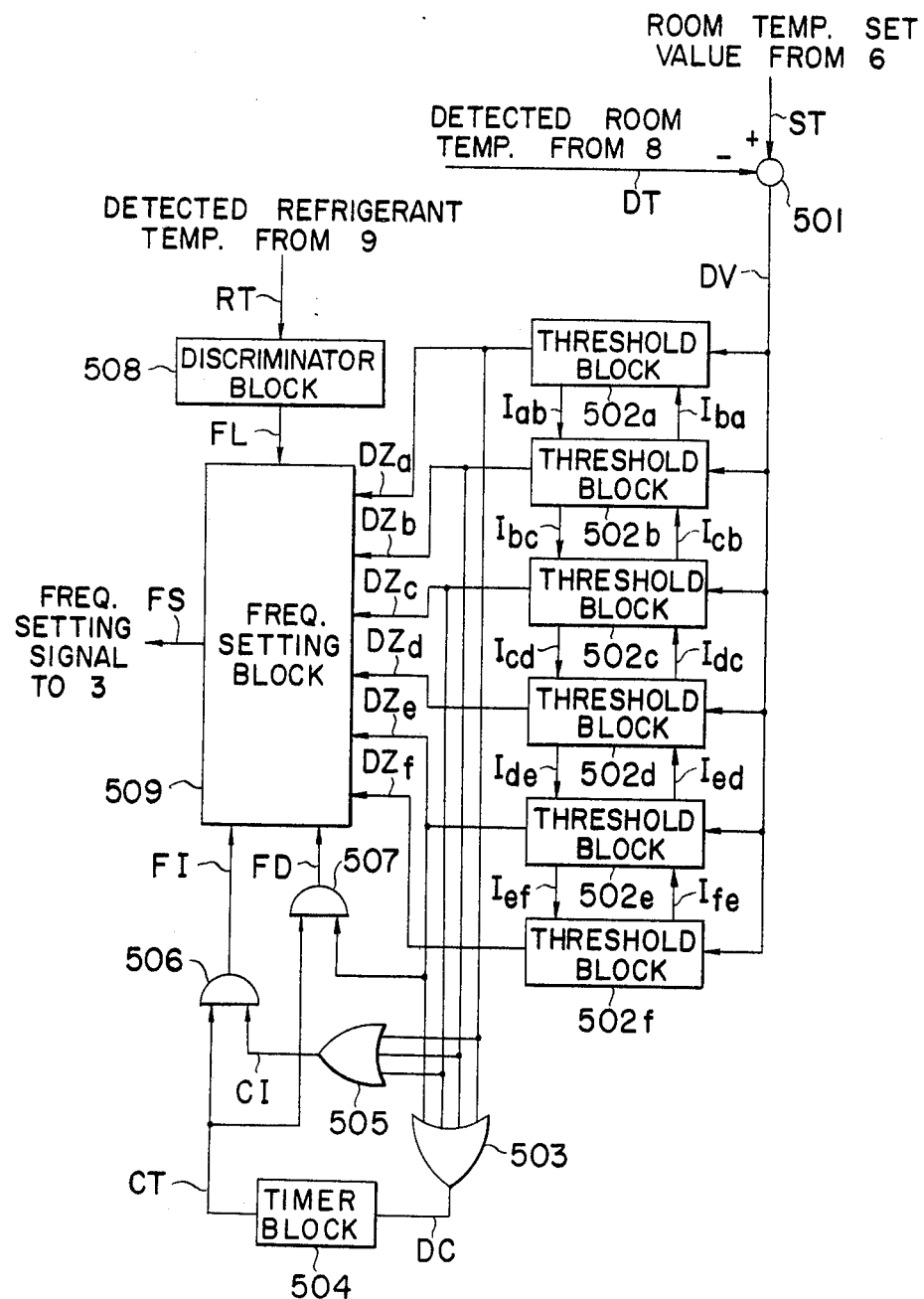
FIG. 3 is a block diagram showing the function of the control system 5 shown in FIG. 1.

The control system 5 is, as mentioned before, mainly formed of a computer, such as a microcomputer, and various operations for control are performed in accordance with programs stored in a program memory device of the microcomputer. FIG. 3 is a block diagram wherein each block shows each of the operations performed as part of the control operation. In other words, each block represents one of the functions the microcomputer performs. Details of the computer programs can be worked out from the following description with reference to FIG. 3.

The room temperature set value ST set by the console unit 6 and the room temperature detected value DT detected by the sensor 8 are applied to an adder block 501 which produces the deviation DV of the latter (DT) with reference to the former (ST). The deviation DV is applied to threshold blocks 502a-502f.

The threshold blocks 502a-502f are respectively provided in association with deviation zones A-F defined by upper and lower threshold values, and determine whether or not the deviation DV is within the respective zones A-F. The deviation DV is judged to be within each zone in accordance with the following criteria.

(a) The deviation was in the zone in question and it has not passed the upper or lower threshold values predetermined for the transition from the zone.

(b) The deviation was outside the zone in question and it has passed the upper or lower threshold values predetermined for the transition into the zone.

The lower and upper threshold levels are predetermined for transition into and out of the respective zones as shown in Table 1.

TABLE 1

| ZONE | TRANSITION INTO THE ZONE | | TRANSITION OUT OF THE ZONE | |
| --- | --- | --- | --- | --- |
| | Upper Threshold | Lower Threshold | Upper Threshold | Lower Threshold |
| A | — | +1.5 | — | +1.0 |
| B | +1.0 | +1.0 | +1.5 | +0.5 |
| C | +0.5 | +0.5 | +1.0 | 0 |
| D | 0 | 0 | +0.5 | −0.5 |
| E | −0.5 | −0.5 | 0 | −1.0 |
| F | −1.0 | — | −0.5 | — |

The zones A–F are arranged in the order in which they require higher cooling power of effect. More particularly, the zone A is of a deviation level which requires the highest cooling power. The zone F is of deviation level which requires the lowest cooling power. The zone D is of deviation level close to zero. The zones A–C are of deviation level which requires higher cooling power than that required when the deviation is in the zone D. The zones E, F are of deviation level which requires lower cooling power than that required when the deviation is in the zone D.

Figure 4:
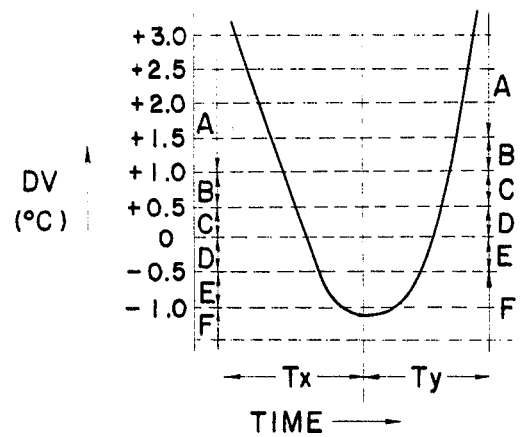
FIG. 4 is a diagram illustrating the threshold values for each zone.

FIG. 4 schematically illustrates a situation wherein the deviation DV falls, from a relatively high value, e.g., about +3.0° C., to a relatively low value, e.g., about −1.1° C. during a first period Tx, and then rises to the high value (about +3.0° C.) during a second period Ty. At the beginning, the deviation DV is within the zone A. When the deviation DV falls below the higher threshold level +1.0° C. for the zone B, the deviation DV is considered to have entered the zone B. When the deviation DV thereafter falls below the higher threshold level +0.5° C. for the zone C, the deviation DV is considered to have entered the zone C. Similarly, when the deviation DV falls below the higher threshold levels 0° C., −0.5° C., −1.0° C., respectively, the deviation DV is considered to have entered the zones D, E, F, respectively. During the second period Ty, when the deviation DV rises above the lower threshold levels −0.5° C., 0° C., +0.5° C., +1.0° C., +1.5° C., the deviation DV is considered to have entered the zones E, D, C, B, A, respectively.

At the start of cooling operation, the judgement of the zone is made in accordance with the following criterion.

(c) When the deviation is below the upper threshold value predetermined for transition into a zone and is above the lower threshold value predetermined for transition from the zone, the deviation is judged to be within the zone.

This means that the deviation is treated as if it were decreasing.

On the other hand, at the start of heating operation, the judgement of the zone is made in accordance with the following criterion.

(d) When the deviation is below the upper threshold value predetermined for transition from a zone and is above the lower threshold value predetermined for transition into the zone, the deviation is judged to be within the zone.

This means that the deviation is treated as if it were increasing.

The binary output signals DZa–DZf become at "H" level when the deviation is found to be within the respective zones A–F. Only one of the signals DZa–DZf is at "H" level at any moment.

An OR gate block 503 receives the signals DZa, DZb, DZc and DZe, and produces a binary output signal DC whose level is at "H" when any one of the signals DZa, DZb, DZc and DZe is at "H". A timer block 504 receives the signal DC and produces a signal CT whose level becomes "H" every predetermined period Ts, e.g., 5 minutes as long as the signal DC continues to be at "H" level.

An OR gate block 505 receives the signals DZa, DZb and DZc, and produces a binary output signal CI whose level is at "H" when any one of the signals DZa, DZb and DZc is at "H". An AND gate 506 produces a frequency increase signal FI whose level is at "H" when the signals CI and CT are both at "H" level.

An AND gate block 507 produces a frequency decrease signal FD whose level is at "H" when the signals DZe and CT are both at "H" level.

A discriminator block 508 produces a frequency limiting signal FL when the detected refrigerant temperature detected by the sensor 9 exceeds a predetermined level.

A frequency setting block 509 produces a frequency setting signal FS whose significance, i.e., the frequency set value is a selected one of the discrete values and is determined in accordance with the signals DZa-DZf, FI, FD and RT, and a predetermined set of formulae.

An example of the formulae for determining the frequency set value is described below.

(1) At the start of the air conditioning operation, the frequency set value is determined as shown in the right column in Table 2, if the deviation DV is found to be within the respective zones shown in the left column.

TABLE 2

| ZONE | FREQ. SET VALUE |
|---|---|
| A | 75 Hz |
| B | 65 Hz |
| C | 55 Hz |
| D | 45 Hz |
| E | 35 Hz |
| F | 0 Hz |

In Table 2, 0 Hz for the zone F means that no current is supplied from the inverter 3 to the compressor 4.

(2) If the deviation DV transits from one of the zones A-D to an adjacent zone of the lower deviation level (which requires lower cooling power), e.g., from the zone A to the zone B, the frequency set value is decreased by 10 Hz.

(3) If the deviation DV transits to the zone F (which requires the lowest cooling power), the frequency set value becomes zero.

(4) If the deviation DV transits from one of the zones B-E to an adjacent zone of the higher deviation level (which requires higher cooling power), e.g., from the zone B to the zone A, the frequency set value is increased by 10 Hz.

(5) If the deviation DV transits from the zone F to the zone E, the frequency set value becomes 35 Hz.

In each of the above formulae mentioned at (2)-(5), transition of the deviation from a zone to another is recognized from the signals DZa-DZf.

(6) When the signal FI becomes at "H" level, the frequency set value is increased by 5 Hz.

(7) When the signal FD becomes at "H" level, the frequency set value is decreased by 5 Hz.

(8) When the signal FL is at "H" level, the increase of the frequency set value is prohibited.

With such an arrangement, the control system operates in a manner as described below.

Figure 5A:
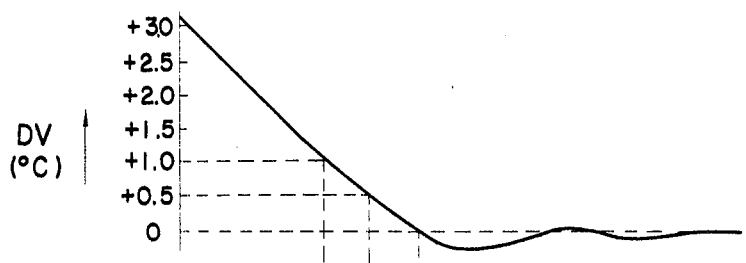
FIGS. 5A, 5B, 6A, 6B, 7A and 7B are diagrams showing variation in temperature deviation and the frequency set value.
Figure 5B:
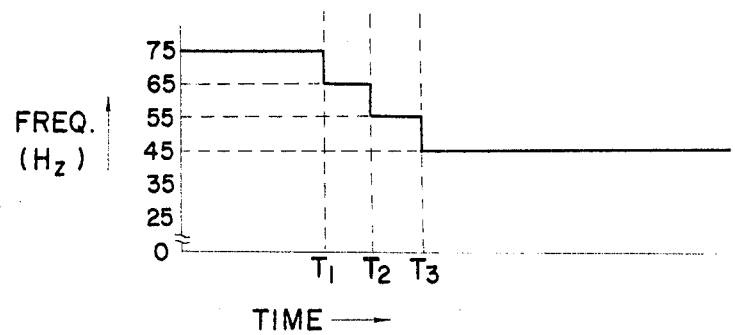
Figure 6A:
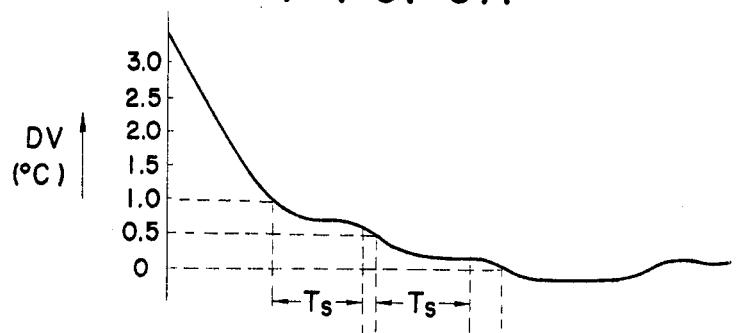
Figure 6B:
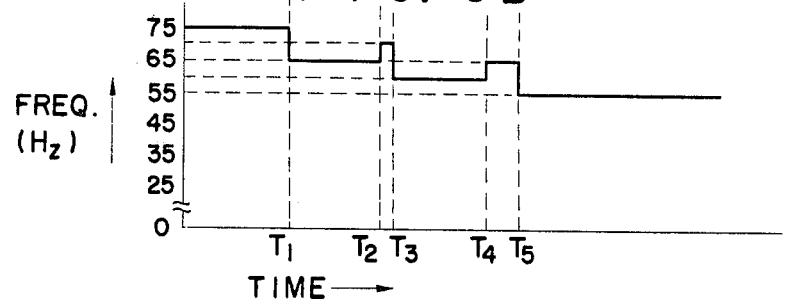

FIGS. 5A and 5B show how the deviation DV and the frequency set value vary where the air conditioning load is modest. It is assumed that the deviation DV is initially about $+3.0°$ C., and in the zone A as shown in FIG. 5A, and the frequency set value is 75 Hz as shown in FIG. 5B. The compressor 4 is driven by an AC current of 75 Hz and the room temperature is rapidly decreased. When the deviation DV falls below $+1.0°$ C., and enters the zone B at a time point $T_1$, the frequency set value is decreased to 65 Hz. The speed of the compressor 4 is decreased a little, but the cooling power is still great, so that the room temperature falls. When the deviation DV falls below $+0.5°$ C. at $T_2$ and subsequently below $0°$ C. at $T_3$, the frequency set value is decreased to 55 Hz and 45 Hz, respectively. With 45 Hz exciting current, for the compressor 4, the cooling power becomes modest, and the room temperature becomes stabilized. The frequency set value is not changed as far as the deviation DV is maintained within $-0.5°$ C. to $+0.5°$ C. range. Thus, once the room temperature becomes close to the set value, frequent change of the frequency set value is avoided.

Where the air conditioning load is heavy, the deviation DV and the frequency set value vary, for example, as shown in FIGS. 6A and 6B. In the example illustrated, the deviation DV, having entered the zone B, stays in the zone B for more than 5 minutes (predetermined time period) and, upon expiration of the 5 minute period, at $T_2$, the output signal CT of the timer block 504 becomes at "H" level. The output signal FI of the AND gate block 506 becomes at "H" level, so that the frequency set value is increased by 5 Hz to 70 Hz. With the increased frequency, the cooling power is increased so that the room temperature rapidly falls. When the deviation DV enters the zone C at $T_3$, the frequency set value is decreased by 10 Hz to 60 Hz. Thereafter, the deviation DV continues to be within the zone C for more than 5 minutes, and hence upon expiration of the 5 minute period, at $T_4$, the frequency set value is increased by 5 Hz to 65 Hz. When the deviation DV enters the zone D at $T_5$, the frequency set value is decreased by 10 Hz to 55 Hz.

Figure 7A:
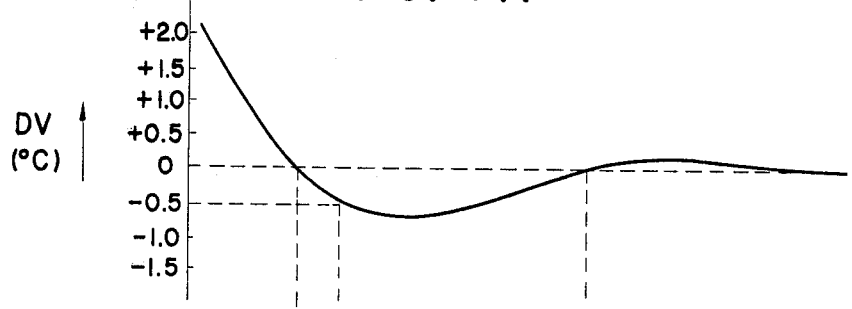
Figure 7B:
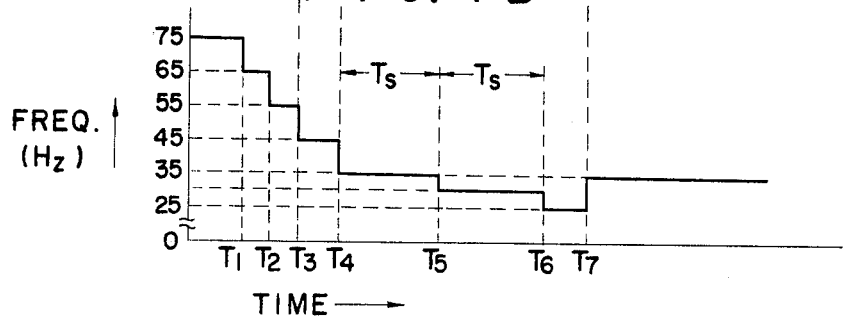

In this way, even where the air conditioning load is heavy, the room temperature quickly becomes close to the set value.

Where the air conditioning load is very light, the deviation DV and the frequency set value vary, for example, as shown in FIGS. 7A and 7B. As illustrated, the deviation DV rapidly falls below $0°$ C. and subsequently below $-0.5°$ C., i.e., enters the zone E, despite the fact that the frequency set value is decreased. Even at the frequency of 35 Hz, the deviation DV continues to be within the zone E. Accordingly, upon expiration of 5 minute period, at $T_5$, the output signal CT of the timer block 504 becomes at "H" level, and hence the output signal FD of the AND gate block 507 becomes at "H" level. As a result, the frequency set value is decreased by 5 Hz to 30 Hz. In the example shown, the deviation DV does not rise rapidly and stays within the zone E, so that, upon expiration of another 5 minute period, at $T_6$, the frequency set value is again decreased by 5 Hz to 25 Hz. When the deviation enters the zone D, at $T_7$, the frequency set value is increased by 10 Hz to 35 Hz.

It will be appreciated from the description made with reference to FIGS. 6A, 6B, 7A and 7B, that the room temperature rapidly becomes close to the set value because the frequency set value is changed when the deviation continues to be within the zone A, B, C or E for more than a predetermined time period.

The number of the zones can be made different from that described above.

The invention is applicable where the air conditioning system is a heating system. In such a case, the compressor 4 is driven by a current of high frequency when the deviation DV of the detected temperature with reference to the temperature set value is negative. This is because the negative deviation requires a higher heating power.

As has been described, an air conditioning system according to the invention is provided with an inverter which can be controlled by a digital frequency setting signal and a control system which is mainly composed of a computer such as a microcomputer, so that complicated control operations can be accomplished without resorting to complicated hardware structure. In addition, the air conditioning load is taken into consideration in determining the frequency, so that the temperature of the air is quickly made close to the set value.

Moreover, since only the discrete frequency values are used it is possible to avoid using the oscillating frequency of the pipes of the particular air conditioning system. That is, when the oscillating frequency is known, the data for the frequency set values can be chosen or modified so that none of the frequency set values are equal to the oscillating frequency.

What is claimed is:

1. A method for controlling an air conditioning system including a frequency-variable power source device for providing an AC electric power of a variable frequency, and a compressor driven by said AC electric power, the air conditioning power of said conditioning system being dependent on the frequency of said AC electric power, said method comprising the steps of:

detecting the temperature of the air to be conditioned, providing a set value for the air temperature, determining a deviation for the detected temperature with reference to the set temperature, determining a frequency set value in accordance with said deviation, and providing a frequency setting signal indicative of said frequency set value used to determine the frequency of said AC electric power, said step of determining the frequency set value comprising:

defining, in advance, a plurality of temperature deviation zones, each zone being defined by upper and lower threshold values, determining, by comparing said deviation with said upper and lower threshold values, the zone in which said deviation is in, determining an initial frequency set value in accordance with said deviation, changing the frequency set value when said deviation transits from one of the zones to another, and changing the frequency set value when said deviation continues to be within one of the zones corresponding to a relatively great deviation over a predetermined length of time.

2. A method according to claim 1, wherein the frequency set value is increased by a predetermined amount when the deviation transits from one of the zones to another zone requiring a higher air conditioning power than that required before the transition, and the frequency set value is decreased by a predetermined amount when the deviation transits from one of the zones to another zone requiring a lower air conditioning power than that required before the transition.

3. A method according to claim 2, wherein the frequency set value is set at zero when the deviation transits to the zone of the deviation requiring the lowest air conditioning power.

4. A method according to claim 1, wherein the frequency set value is increased by a predetermined amount when the deviation continues, over a predetermined length of time, to be within one of the zones requiring higher air conditioning power than that required when the deviation is approximately zero, and the frequency set value is decreased by a predetermined amount when the deviation continues, over a predetermined length of time, to be within one of the zones requiring lower air conditioning power than that required when the deviation is approximately zero.

5. A method according to claim 4, wherein the frequency set value for the zone of the deviation requiring the lowest air conditioning power is initially set at zero and is not changed even when the deviation continues, over the predetermined length of time, to be within said zone.

6. A method according to claim 1, wherein the upper threshold value set for transition of the deviation into a predetermined zone is lower than the upper threshold value set for transition from the predetermined zone, and the lower threshold value set for transition of the deviation into the predetermined zone is higher than the lower threshold value set for transition from the predetermined zone.

* * * * *